May 26, 1931.  F. WELSH  1,806,867
LEAK STOPPING DEVICE FOR PIPES
Filed April 11, 1929
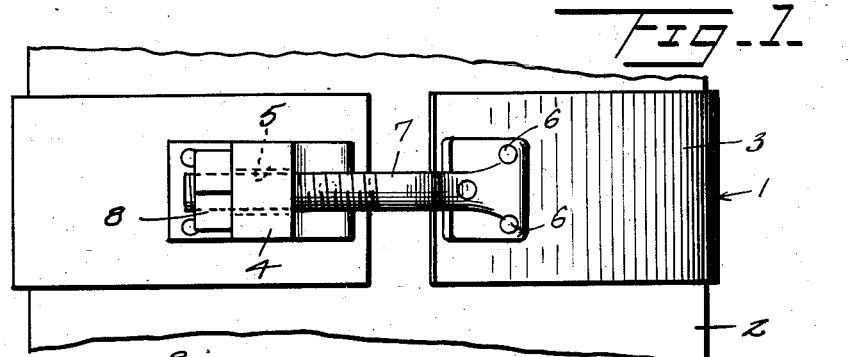
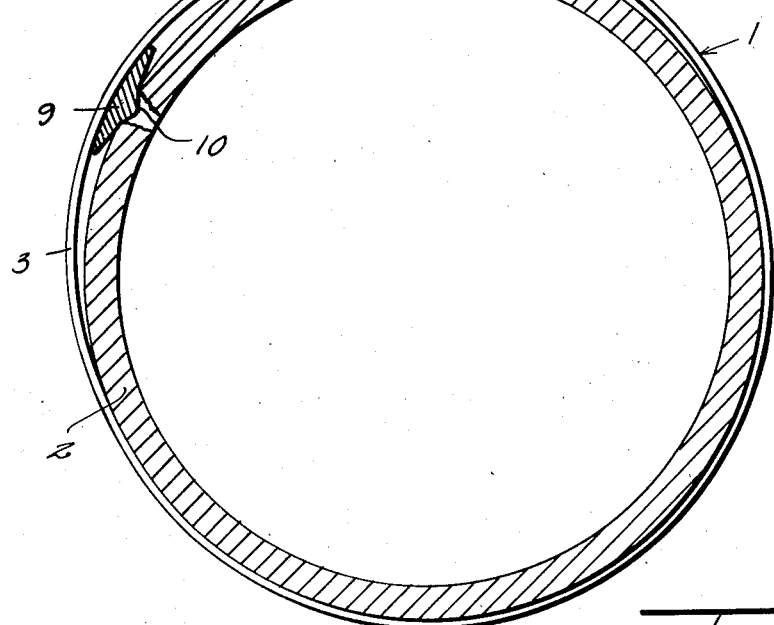
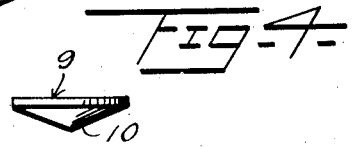
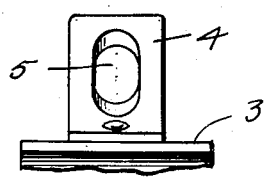
Inventor
Frank Welsh
By Watson E. Coleman Patented May 26, 1931

1,806,867

UNITED STATES PATENT OFFICE

FRANK WELSH, OF GRANVILLE, OHIO

LEAK STOPPING DEVICE FOR PIPES

Application filed April 11, 1929. Serial No. 354,359.

This invention relates to devices for stopping leaks in pipes and has for its primary object to provide a device which may be readily and quickly applied to a pipe of any character, which will hold against an opening in the pipe a suitable stopper device for checking the flow of a fluid therefrom.

The invention broadly contemplates the provision of a relatively broad resilient metal band formed in the shape of a split ring and having an apertured ear secured at one end and a bolt secured at one end to the opposite end of the band to project therefrom for extension through said ear. The band is designed to be placed about a pipe over the leak and formed for interposition between the band and the pipe to overlie the leak is a stopper of rubber, asbestos, or other suitable material which the band binds tightly against the pipe when the ends of the band are drawn together. A suitable nut is provided for attachment to the end of the bolt after it is passed through the ear to draw the bolt to position.

The invention will be best understood from a consideration of the following detailed description taken in connection with the accompanying drawings forming a part of the present invention with the understanding, however, that the invention is not confined to any strict conformity with the showing of the drawings but may be changed or modified so long as such changes or modifications mark no material departure from the salient features of the invention as expressed in the appended claim.

In the drawings:—

Figure 1 is a plan view of the device embodying the present invention showing the same in applied position;

Figure 2 is a view in side elevation of the device showing the supporting pipe therefor in section;

Figure 3 is a detailed view of one end of the band looking toward the apertured ear carried thereby;

Figure 4 is a detailed side elevational view of the leak stopping plug associated with the band.

Referring to the drawings in detail, the numeral 1 indicates generally the leak stopping device for pipes embodying the present invention, the same being shown in side elevation in applied position upon a pipe 2.

As shown, the device comprises a split annular band of resilient metal 3, such for example, as spring steel or the like and riveted to the outer surface of the band, at one end, is an outstanding ear 4 through which is formed an aperture 5 which is directed transversely of the band body, as shown. Upon the opposite end of the band there is secured as at 6, one end of a relatively long threaded bolt 7 which is designed when the band is placed into use to be extended through the aperture of the ear 4 and to receive a nut 8 which bears against the side of the ear away from the bolt.

For use in association with the holding band 3, there is provided a disk 9 of resilient material, one face of the disk being cone-shaped as indicated at 10. This disk is adapted to have the pointed side positioned in an opening of a pipe to close the same and it is firmly secured in position by the band which surrounds the pipe and overlies the disk and which has its ends drawn together by the nut and bolt 7 and 8 in the manner shown.

From the foregoing description it will be readily seen that with a device of the character herein described, a leak may be readily stopped in any type of pipe.

Having thus described my invention, what I claim is:—

A means for holding a resilient member against an aperture in a pipe whereby to close the aperture comprising a split annular band, an upstanding lug having a base extending outwardly of each side thereof, rivet means for securing the base at one end of said band, said lug having a tapering slotted aperture therethrough, a threaded bolt, rivet means for securing said bolt to the opposite end of said band, said bolt being adapted to extend through said slotted portion of said lug, and a nut threadedly engaging the bolt and bearing against said lug whereby to tighten the band about said pipe upon rotation of the nut in one direction.

In testimony whereof I hereunto affix my signature.

FRANK WELSH.